United States Patent
Kurz et al.

(10) Patent No.: US 7,234,573 B2
(45) Date of Patent: Jun. 26, 2007

(54) BRAKE SHOE AND METHOD FOR PRODUCING A BRAKE SHOE

(75) Inventors: Gerhard Kurz, Augsburg (DE); Wilfried Schnell, Lindlar (DE); Georg Eichner, Ismaning (DE); Wolfgang Hoffrichter, Cologne (DE)

(73) Assignee: TMD Friction GmbH, Leverkusen (DE)

( * ) Notice: Subject to any disclaimer, the term of this patent is extended or adjusted under 35 U.S.C. 154(b) by 0 days.

(21) Appl. No.: 10/332,529

(22) PCT Filed: Apr. 21, 2001

(86) PCT No.: PCT/EP01/07028

§ 371 (c)(1),
(2), (4) Date: Jul. 2, 2003

(87) PCT Pub. No.: WO02/06695

PCT Pub. Date: Jan. 24, 2002

(65) Prior Publication Data

US 2004/0003972 A1 Jan. 8, 2004

(30) Foreign Application Priority Data

Jul. 13, 2000 (DE) .............................. 100 34 210

(51) Int. Cl.
*F16D 69/00* (2006.01)
(52) U.S. Cl. .............................. 188/250 B; 188/250 E; 188/250 R

(58) Field of Classification Search ............ 188/251 R, 188/251 A, 250 B, 250 E, 250 R, 73.1, 73.37; 523/149, 152; 192/107 M, 107 R
See application file for complete search history.

(56) References Cited

U.S. PATENT DOCUMENTS

| | | | | |
|---|---|---|---|---|
| 3,835,963 | A | * | 9/1974 | Ohtani ...................... 188/73.1 |
| 4,632,797 | A | * | 12/1986 | Tapanainen ................. 264/260 |
| 5,083,643 | A | * | 1/1992 | Hummel et al. ........ 188/251 A |
| 5,358,684 | A | * | 10/1994 | Valentin ...................... 419/10 |
| 5,407,034 | A | * | 4/1995 | Vydra et al. ............. 188/73.37 |
| 5,413,194 | A | * | 5/1995 | Kulis et al. ............. 188/251 A |
| 5,732,800 | A | * | 3/1998 | Spigener .................... 188/234 |
| 6,032,767 | A | * | 3/2000 | Roehling .................. 188/73.1 |
| 6,405,840 | B1 | * | 6/2002 | Foster et al. ............ 188/250 B |

FOREIGN PATENT DOCUMENTS

JP    61-140632  A  *  6/1986  ............. 188/250 B

* cited by examiner

*Primary Examiner*—James McClellan
*Assistant Examiner*—Mariano Sy
(74) *Attorney, Agent, or Firm*—Diller, Ramik & Wight

(57) ABSTRACT

In a brake shoe (1) comprising a carrier plate (2) having arranged thereon first a dampening and noise-reducing intermediate layer (4) and then a friction lining (6), it is provided that the intermediate layer (4), on the side thereof facing towards the friction lining (6), comprises a three-dimensional surface structure, and that the friction lining (6) on the carrier-plate side is adapted to the surface contour (5) of the intermediate layer (4).

6 Claims, 4 Drawing Sheets

BRAKE SHOE AND METHOD FOR PRODUCING A BRAKE SHOE

BACKGROUND OF THE INVENTION

The invention relates to a brake shoe according to the preamble of claim 1, and a method for producing a brake shoe according to the preamble of claim 11.

It is already known to arrange a dampening intermediate layer between a carrier plate and a friction lining. This intermediate layer has a uniform layer thickness of 3 mm, for instance. This intermediate layer is useful, e.g., for bonding the friction lining to the carrier plate with high strength.

In known brake linings, undesired accompanying phenomena will occur during braking, depending on the wear condition of the brake shoe. With increased wear, for instance, brake shoes are known to contribute to a heightened generation of brake noises because the friction linings tend to become harder and lose compressibility with increased service life and thermal stress. For this reason, the friction linings will become less capable to adapt to the brake disks which undergo geometric changes (e.g. shield formation) under the influence of heat.

The generated noises can be characterized as follows:
crumpling (broad-band noise: 200 Hz to 8 kHz)
squeaking (1500 Hz to 15 kHz)
juddering (20 Hz to 100 Hz)
humming (200 Hz to 600 Hz), and
wire-brush noises.

Juddering effects such as vibrations of the steering wheel and pulsation of the brake pedal, as well as humming, can increase along with the progression of the wear condition.

SUMMARY OF THE INVENTION

It is an object of the invention to provide a brake shoe and a method, respectively, for producing a brake shoe, which make it possible to keep the development of noise and the transmission of vibrations onto the steering wheel or the brake pedal continuously low throughout the lifespan of the brake shoes.

The above object is solved by the features of claim 1 as well as of claims 11 to 16.

According to the invention, it is advantageously provided that the intermediate layer, on the side thereof facing towards the friction lining, comprises a three-dimensional surface structure, and that the friction lining on the side of the carrier plate is adapted to the surface contour of the intermediate layer. The intermediate layer is provided to exert a favorable influence on the stiffness of the brake lining in the radial direction and the tangential direction of the brake lining relative to the brake disk by influencing the compressibility and the dampening of the brake lining. In this manner, brake noises and the transmission of vibrations onto the steering wheel and the brake pedal can be reduced to a minimum.

A further objective resides in influencing the compressibility and thus the surface pressure in the axial direction. The influencing of the compressibility results in a high dampening of humming, squeaking and crumpling noises.

Preferably, the friction lining is soft and elastic in the tangential direction. Thereby, the tendency towards juddering can be reduced so that noises, rotational vibrations of the steering wheel and pulsation of the pedal will be decreased. In this arrangement, the friction lining can be relatively stiff in the radial direction.

The three-dimensional surface structure of the intermediate layer also influences the effective friction radius and the heat intake into the brake disk while the lining can optimally adapt to the geometric changes of the brake disk.

It is provided that the intermediate layer comprises a material which is soft relative to the friction lining and is highly dampening. By means of the three-dimensional surface structure, it is made possible to adjust the stiffness and dampening properties within wide ranges without changing the friction material. In this manner, also the friction behavior and the wear can be favorably influenced.

In a preferred embodiment, it is provided that the surface structure of the intermediate layer facing towards the friction lining comprises projections extending into the friction lining.

According to one embodiment, it can be provided that the projections extend into the surface of the friction lining.

The projections can have a bar-shaped, conical or sinusoidal cross-sectional shape.

Alternatively, the projections can have a cylindrical shape. The three-dimensional surface structure of the intermediate layer can be oriented symmetrically relative to a radial axis of symmetry of the carrier plate. This radial axis of symmetry is related to the rotational axis of the wheel and the brake disk, respectively.

In an alternative embodiment, it is provided that the projections are arranged asymmetrically relative to the radial axis of symmetry of the carrier plate. By use of the symmetrical or asymmetrical arrangement of the projections of the intermediate layer, the direction-dependent stiffness of the friction lining can be adapted to different requirements.

In one embodiment, it is provided that the side of the intermediate layer facing towards the friction lining is inclined relative to the carrier plate and forms a wedge-shaped intermediate layer having a three-dimensional surface structure.

The wedge-shaped orientation of the surface structure can be provided relative to a radial axis of symmetry of the carrier disk and/or to an axis which is orthogonal to the axis of symmetry and parallel to the carrier plate.

In a preferred method for manufacturing a brake shoe, it is provided that, in a first press-molding step, the material of the intermediate layer is pressed to obtain a predetermined three-dimensional surface structure for forming an intermediate layer, while, in a second step, the friction material is introduced into the same mold and the friction lining together with the pre-molded intermediate layer and the carrier plate is finish molded.

In an alternative method for the production of a brake shoe, on the other hand, it is provided that, in a first step, the material of the intermediate layer is introduced into a mold and, by means of a vibrating or shaking die, is pre-molded to obtain a predetermined three-dimensional surface structure without being pressed, while, in a second step, the friction material for the friction lining is added and pre-molded, and that, in a third step, the pre-molded but not yet pressed material of the intermediate layer and the pre-molded friction material are together finish molded on the carrier plate a press mold by a sole press-forming step under the influence of heat and pressure.

In a further alternative method for the production of a brake shoe, on the other hand, it is provided that, in a first step, the material of the intermediate layer is pre-molded to obtain a predetermined three-dimensional surface structure for forming an intermediate layer, in a second step, the carrier plate and the prefabricated intermediate layer are inserted into a press mold, in a third step, friction material is filled into the press mold, and, in a fourth step, the friction lining is finish molded on the carrier plate under the influence of heat and pressure.

The following alternative methods are applicable particularly if the bottom of the press mold is formed by a press die and the upper end of the press mold is terminated by the carrier plate. In this case, the friction material is first introduced into the press mold.

Thus, in a further alternative method for the production of a brake shoe, it is provided that, in a first step, the friction material is filled into the press mold and is pre-molded to obtain a predetermined three-dimensional surface structure, in a second step, the material of the intermediate layer is filled onto the pre-molded friction material in the press mold and, in a third step, the friction lining is finish molded on the carrier plate by common press-molding of the pre-molded friction material and the material of the intermediate layer.

In a further alternative method for the production of a brake shoe, it is provided that, in a first press-molding step, the material of the intermediate layer is pre-molded to obtain a pre-molded three-dimensional surface structure for forming an intermediate layer, in a second step, the friction material is filled into the press mold, in a third step, the pre-molded intermediate layer is laid onto the friction material in the press mold and, in a fourth step, the friction lining is finish molded on the carrier plate by common press-molding of the pre-molded intermediate layer and the friction material.

In a further variant of a method for the production of a brake shoe, it is provided that, in a first press-molding step, the friction material is pre-molded to obtain a predetermined three-dimensional surface structure, in a second step, the pre-molded friction material is inserted into a press mold, in a third step, the material of the intermediate layer is introduced and, in a fourth step, the friction lining is finish molded on the carrier plate by common press-molding of the pre-molded friction material and the material of the intermediate layer.

Embodiments of the invention will be explained in greater detail hereunder with reference to the drawings:

DESCRIPTION OF THE PREFERRED EMBODIMENTS

Figure 1:
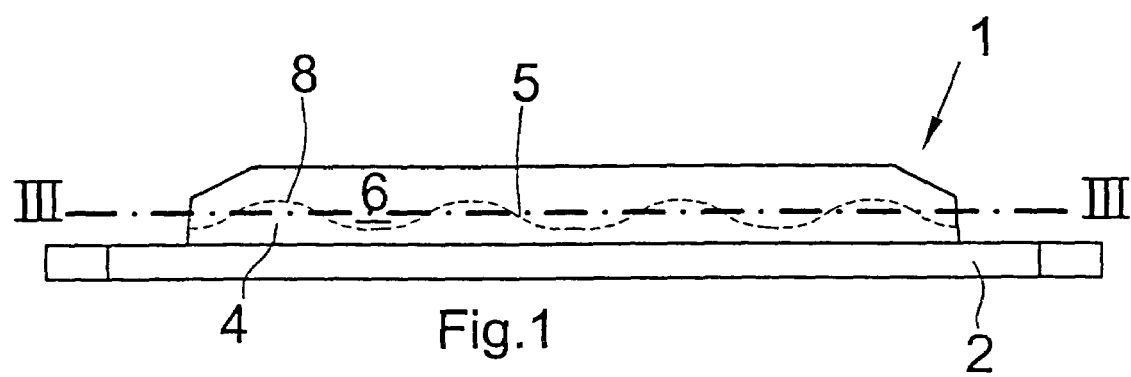
FIG. 1 is a view of a first embodiment of a surface structure of the intermediate layer of a brake shoe.

The first embodiment of a brake shoe 1, shown in FIG. 1, comprises a metallic carrier plate 2 having first arranged thereon an intermediate layer 4 functioning as a dampening layer between the friction lining 6 and the carrier plate 2.

The intermediate layer 4 comprises, on the side thereof facing towards the friction lining 6, a three-dimensional surface structure 5 provided with projections 8 engaging the friction lining 6. The friction lining 6 is correspondingly adapted to the surface contour 5 of the intermediate layer 4 and comprises a friction material of the usual type.

Figure 3:
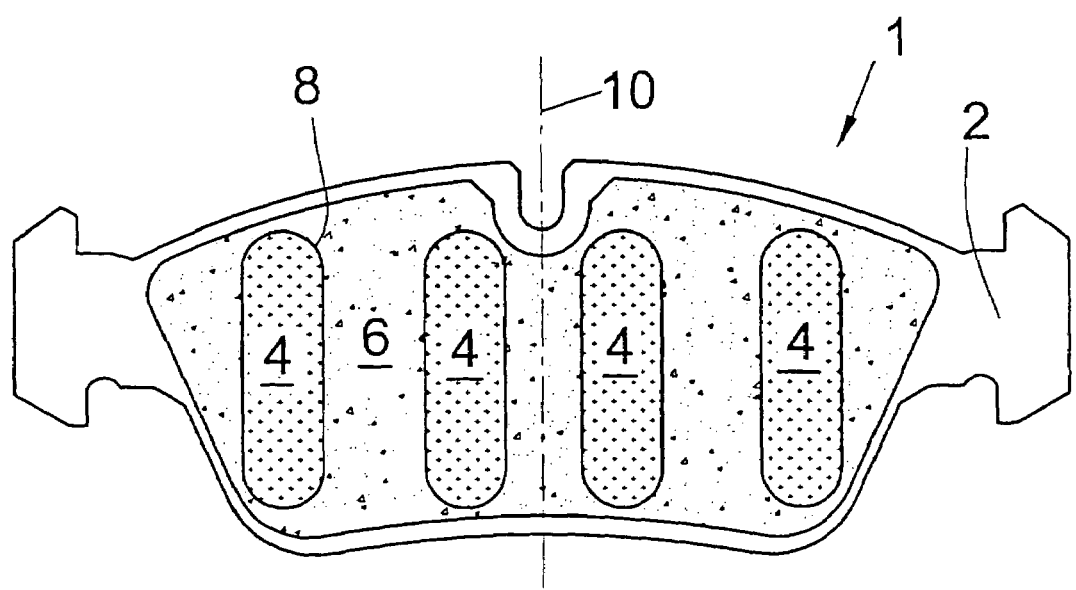
FIG. 3 is a sectional view taken along the line III—III in FIG. 1.

In FIG. 1, the surface structure 5 of that side of the intermediate layer 4 which is facing towards the friction lining 6 is indicated by the interrupted line. Thus, the embodiment according to FIG. 1 presents a three-dimensional surface structure of the intermediate layer 4 which, when viewed in cross-section, has a wave shape. FIG. 3 is a sectional view taken along the line III—III in FIG. 1, from which it can be seen that the three-dimensional surface structure 5 comprises projections 8 extending into the friction lining 6. In FIG. 3, the projections 8 formed in the surface structure 5 are illustrated in a sectional view.

By means of the three-dimensional surface structure 5, the stiffness of the brake lining can be influenced in the radial direction as well as in the tangential direction. The accommodation of projections 8, 8', 8", 8'" in friction lining 6 makes it possible to keep the compressibility and dampening of brake shoe 1 constant throughout the service life of the brake shoes and thus to keep the noise development and the transmission of vibrations onto the steering wheel or the brake pedal low.

Further, the compressibility and dampening should be favorably influenced also in the axial direction. In this manner, brake noises such as humming, squeaking or crumpling can be minimized.

Figure 2:
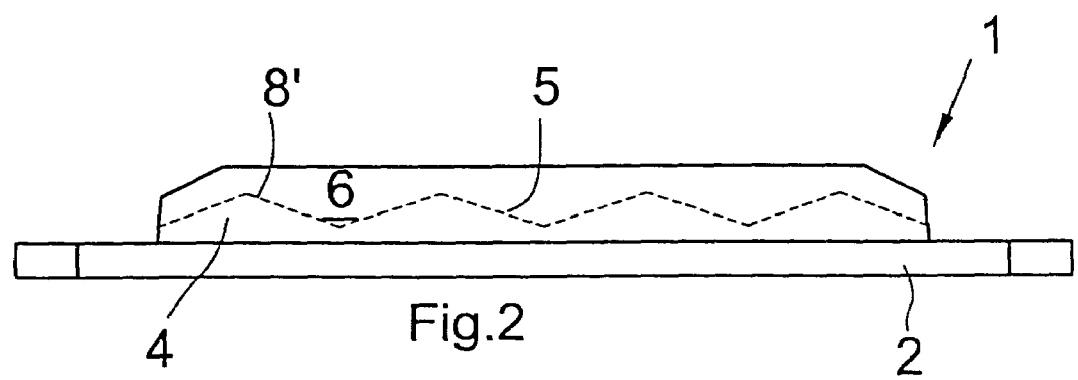
FIG. 2 is a view of a second embodiment.

FIG. 2 shows a further embodiment of a brake shoe 1 with a surface structure 5 which, in cross-sectional view, comprises roof-shaped or prismatic projections 8'.

Figure 4:
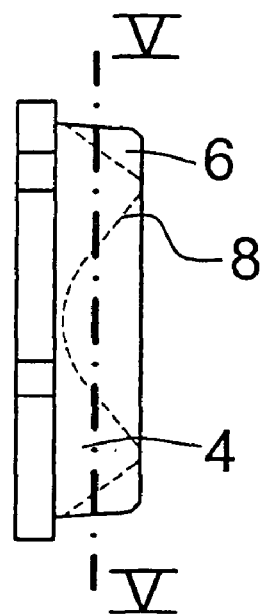
FIG. 4 is a lateral view of a third embodiment.
Figure 5:
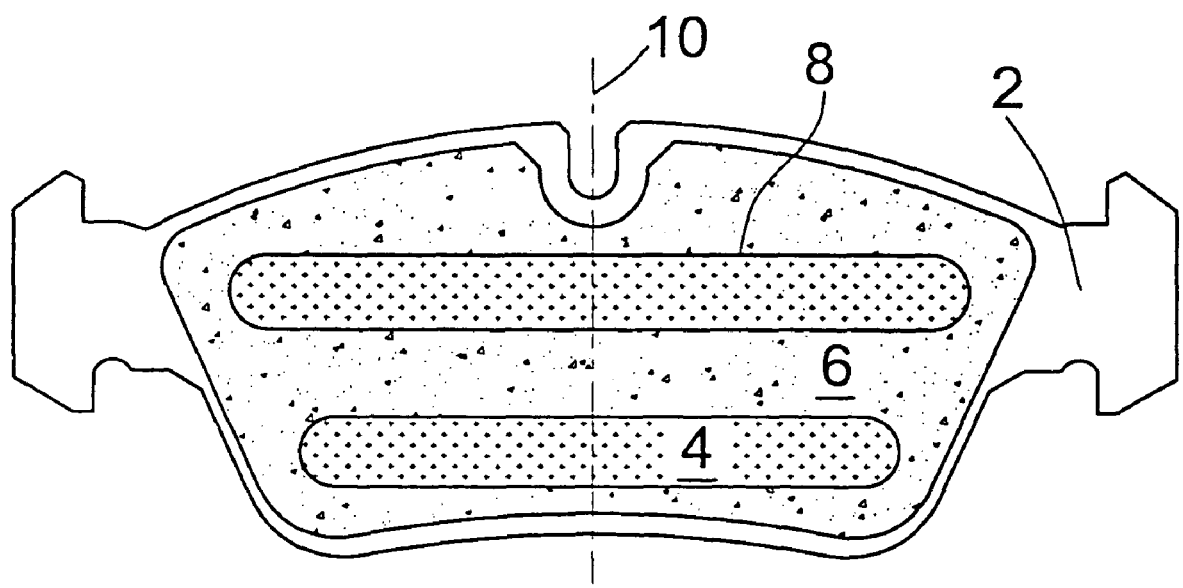
FIG. 5 is a sectional view taken along the line V—V in FIG. 4.

FIG. 4 shows a third embodiment comprising projections 8 having sinusoidal or triangular shapes as viewed in cross section, with the projections, in contrast to the embodiment according to FIG. 3, extending in a transverse direction relative to the radial axis of symmetry 10 of brake shoe 1. This can be best seen in FIG. 5 which is a sectional view taken along the line V—V in FIG. 4.

Figure 6:
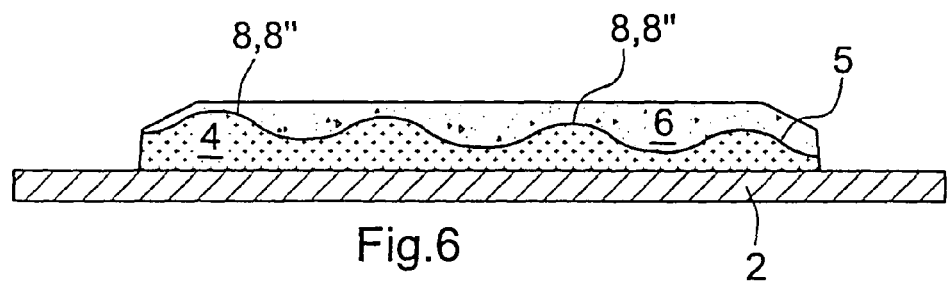
FIG. 6 is a view of an embodiment with wedge-shaped surface structure of the intermediate layer.

Illustrated in FIG. 6 is a fourth embodiment wherein the surface structure 5 extends at an inclination relative to the carrier plate 2, thus forming a wedge-shaped intermediate layer 4 with three-dimensional surface structure 5.

Figure 11:
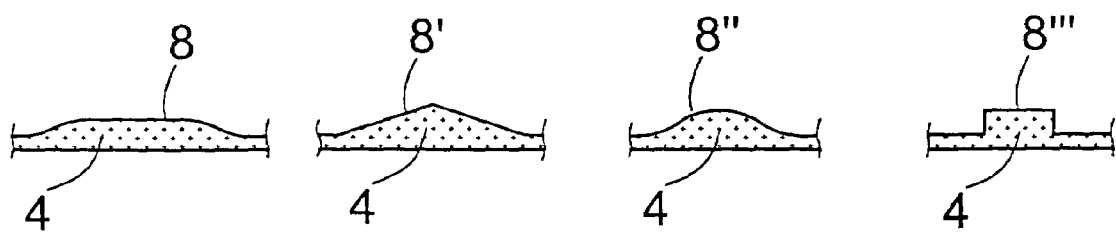
FIG. 11 illustrates different cross-sectional shapes of the projections of the intermediate layer.

In this arrangement, the projections of the surface structure 5 can have any one of the various cross-sectional shapes illustrated in FIG. 11. The surface structure 5 can be inclined about one or two axes. For instance, the inclination can be adjusted relative to the radial axis of symmetry 10 and/or an axis which is orthogonal to this axis of symmetry 10 and parallel to the carrier plate 2.

Figure 7:
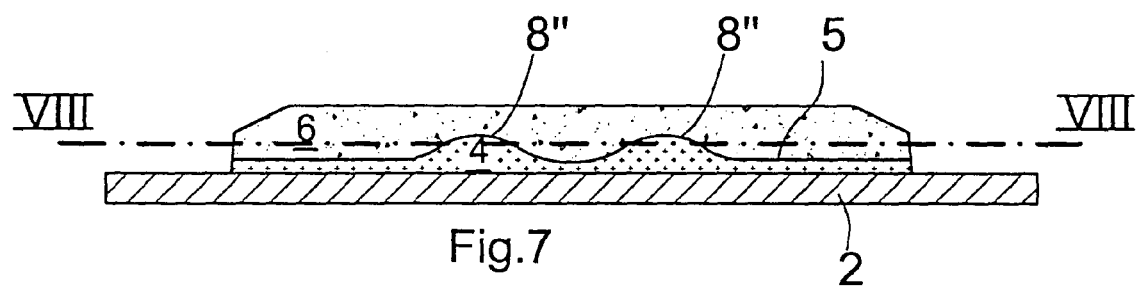
FIG. 7 is a view of a further embodiment.
Figure 8:
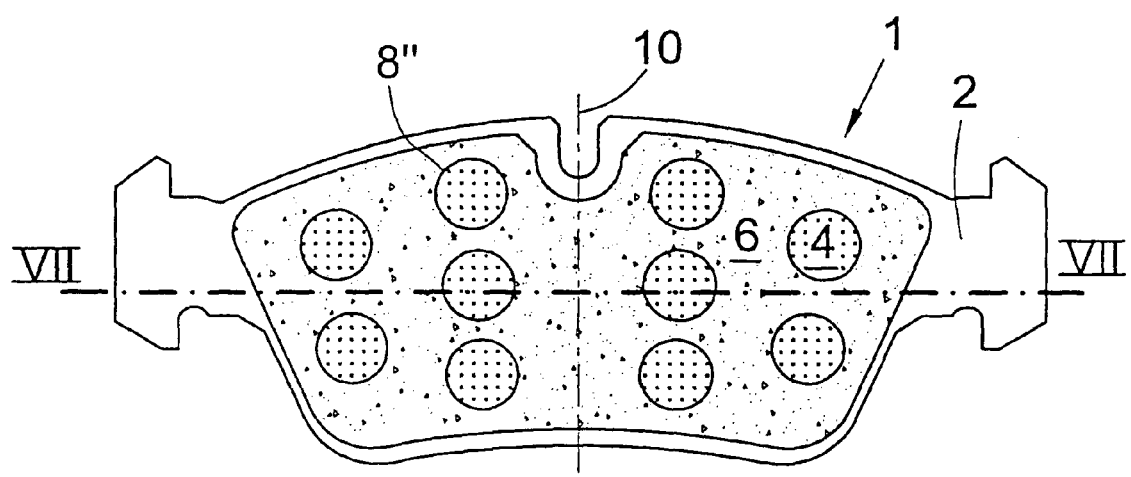
FIG. 8 is a sectional view taken along the line VIII—VIII in FIG. 7.

The embodiment according to FIGS. 7 and 8 presents a surface structure 5 comprising dot-shaped projections 8".

FIG. 7 is a sectional view taken along the line VII—VII in FIG. 8, and FIG. 8 is a sectional view taken along the line VIII—VIII in FIG. 7.

Figure 9:
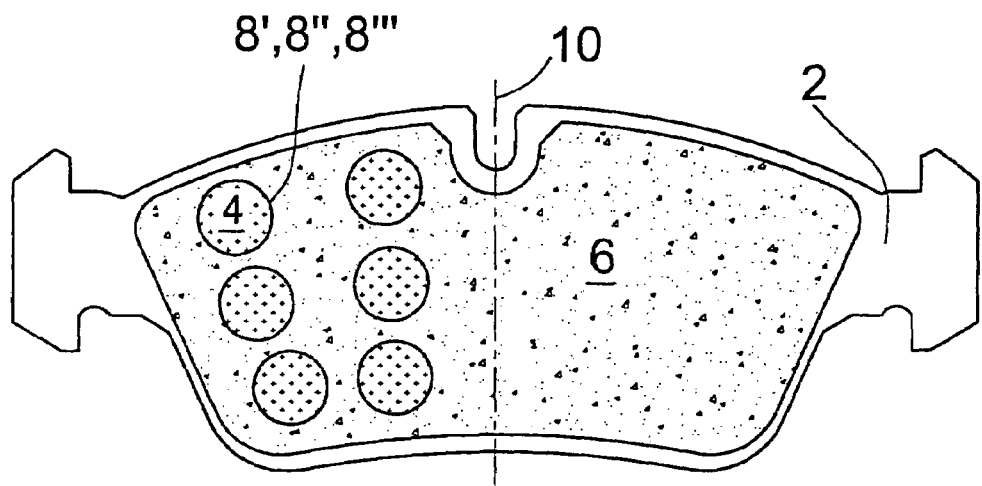
FIG. 9 is a view of an embodiment with an asymmetrical arrangement of the surface structure.
Figure 10:
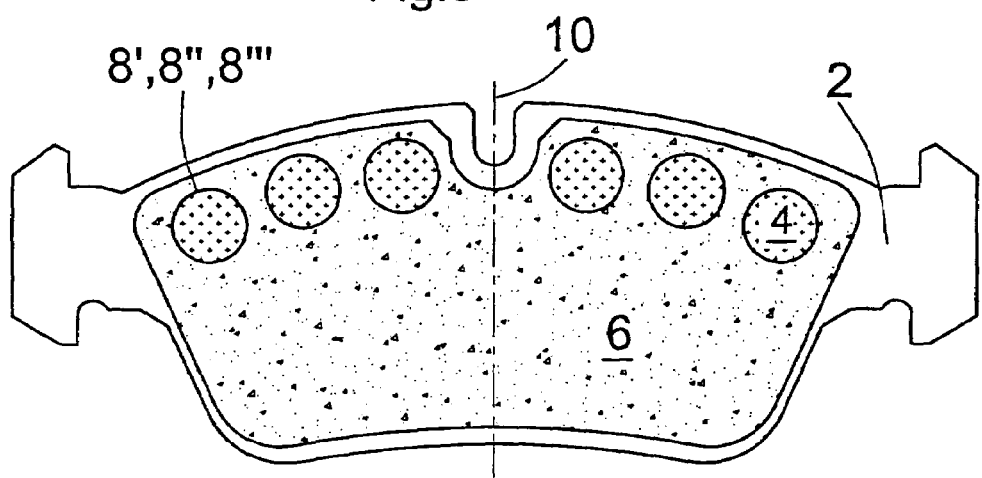
FIG. 10 is a view of an embodiment with an symmetrical arrangement of the surface structure relative to a radial axis of symmetry of the brake shoe.

The embodiment according to FIG. 9 presents an asymmetrical arrangement of the projections relative to the radial axis of symmetry 10. The pattern of the arrangement of projections 8, 8', 8", 8'" depends on the individual properties of the brake and the brake disk with regard to the construction and the vibration characteristics in combination with the friction material of the friction lining.

FIG. 11 shows different cross-sectional shapes of the projections 8, 8', 8", 8'". The projections 8 are elongate, bar-shaped projections as illustrated e.g. in FIGS. 3 or 5 while the projections 8', 8" and 8'" are dot-shaped projections.

On the other hand, the cross-sectional shapes of the projections 8',8",8'" can also be cross sections of bar-shaped projections, as shown in FIG. 2. A sectional view of the embodiment according to FIG. 2 with triangular cross-sectional structure of the projections 8' would result in a similar cross-sectional configuration as in FIG. 3.

A preferred composition of intermediate layer 4 comprises:

0–40% by weight: metals
10–60% by weight: fillers
5–25% by weight: organic additives
0–10% by weight: organic/anorganic fibers.

It is essential that the intermediate layer as a binder layer does not contain any lubricants.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of manufacturing a brake shoe (1) defined by a carrier plate (2) devoid of any openings formed therethrough and having arranged upon the entirety of a surface thereof a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5) projecting in a direction away from the carrier plate (2), the friction lining (6) on a side facing the carrier plate (2) having surface contours complementary to the surface contours (5) of the single intermediate layer (4), and the single intermediate layer surface contours (5) being bonded to the friction lining surface complementary contours absent a boundary member therebetween by performing the steps of:
  (a) placing a carrier plate (2) devoid of any openings formed therethrough into a first press mold,
  (b) pre-press molding intermediate layer material in the same first press mold to form a single pre-pressed intermediate layer (4) upon the entirety of a surface of the carrier plate (2) including the three-dimensional surface contours (5) thereof,
  (c) after the performance of step (b), introducing the friction lining material into the same first press mold upon the entire three-dimensional surface contours (5) of the single intermediate layer (4), and
  (d) in the same first press mold bonding the friction lining material to the single pre-pressed intermediate layer (4) along the three-dimensional surface contours (5) thereof by finish press molding the single pre-pressed intermediate layer (4) and the friction lining (6) in association with bonding the single pre-pressed intermediate layer (4) to an entire surface of the carrier plate (2) to complete the molding of the brake shoe (1) absent a boundary member between the surface contours and absent mechanical attachment between the single intermediate layer (4) and the carrier plate (2).

2. A method of manufacturing a brake shoe (1) defined by a carrier plate (2) devoid of any openings formed therethrough having arranged upon the entirety of a surface thereof a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5) projecting in a direction away from the carrier plate (2), the friction lining (6) on a side facing the carrier plate (2) having surface contours complementary to the surface contours (5) of the single intermediate layer (4), and the single intermediate layer surface contours (5) being bonded to the friction lining complementary surface contours absent a boundary member therebetween by performing the steps of:
  (a) pre-press molding the intermediate layer material to form a single pre-pressed intermediate layer (4) including the three-dimensional surface contours (5) thereof,
  (b) after performing step (a), introducing the carrier plate (2) devoid of any openings formed therethrough and the single pre-pressed intermediate layer (4) formed in accordance with step (a) into a press mold,
  (c) charging friction lining material into the press mold upon the surface contours (5) of the single pre-pressed intermediate layer (4), and
  (d) finish press molding the single pre-pressed intermediate layer (4) and the friction lining material to create the friction lining (6) bonded to the surface contours (5) of the finish press molded single intermediate layer (4) absent a boundary member therebetween and bonding the finish press molded intermediate layer (4) to the entirety of a surface of the carrier plate (2) absent mechanical attachment therebetween.

3. A method of manufacturing a brake shoe (1) defined by a carrier plate (2) devoid of any openings formed therethrough and having arranged thereon a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5), the friction lining (6) on a side facing the carrier plate (2) having surface contours complementary to the surface contours (5) of the single intermediate layer (4), and the intermediate layer surface contours (5) being bond to the friction lining complementary surface contours absent a boundary member therebetween by performing the steps of:
  (a) pre-press molding the intermediate layer material to form a single pre-pressed intermediate layer (4) including the three-dimensional surface contours (5) thereof,
  (b) charging a press mold with friction lining material,
  (c) placing the single pre-pressed intermediate layer (4) molded in accordance with step (a) atop the friction lining material with the intermediate layer surface contours (5) opposing the friction lining material, and
  (d) finish press molding the friction lining material to form the friction lining (6) bonded to the surface contours (5) of the intermediate layer (4) and bonding the single intermediate layer (4) upon the entirety of a surface of the carrier plate (2) absent a boundary member between the surface contours and absent mechanical attachment between the single intermediate layer (4) and the carrier plate (2).

4. A method of manufacturing a brake shoe (1) defined by a carrier plate (2) devoid of any openings formed therethrough having arranged thereon a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5) projecting in a direction away from the carrier plate (2), the friction lining (6) on a side facing the carrier plate (2) having surface contours complementary to the surface contours (5) of the single intermediate layer (4), and the intermediate layer surface contours (5) being bonded to the friction lining complementary surface contours absent a boundary member therebetween by performing the steps of:
  (a) placing a carrier plate (2) devoid of any openings formed therethrough into a first press mold,
  (b) pre-press molding intermediate layer material in the same first press mold under conditions of vibration to form a single pre-pressed intermediate layer (4) including the three-dimensional surface contours (5) thereof,
  (c) after the performance of step (b), introducing the friction lining material into the same first press mold upon the intermediate layer surface contours (5) of the single pre-pressed intermediate layer (4), and
  (d) finish press molding the friction lining material in the same first press mold to form the friction lining (6) bonded to the surface contours (5) of the pre-press molded single intermediate layer (4) and finish press molding the single pre-pressed intermediate layer into the finish pressed intermediate layer (4) while bonding the intermediate layer (4) to the entirety of a surface of the carrier plate (2) absent a boundary member between the surface contours and absent mechanical attachment between the single finish press molded intermediate layer (4) and the carrier plate (2).

5. A method of manufacturing a brake shoe (1) defined by a carrier plate (2) devoid of any openings formed therethrough and having arranged thereon a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5) projecting in a direction away from the carrier plate (2), the friction lining (6) on a side facing the carrier plate (2) having surface contours complementary to the surface contours (5) of the single intermediate layer (4), and the intermediate layer surface contours (5) being bonded to the friction lining complementary surface contour absent a boundary member therebetween by performing the steps of:
  (a) pre-press molding the friction lining material in a press mold to create a pre-pressed friction lining (6) including the complementary surface contours thereof,
  (b) charging the press mold with the intermediate layer material atop the friction lining surface contours of the pre-pressed friction lining (6) after the pre-pressed friction lining (6) has been created in accordance with step (a), and
  (c) finish press molding (i) the intermediate layer material to create the single finish press molded intermediate layer (4) and (ii) the friction lining material to create the finish press molded friction lining (6) bonded to each other along the surface contours thereof absent a boundary member therebetween and (iii) bonding the single intermediate layer (4) to the entirety of a surface of the carrier plate (2) absent mechanical attachment therebetween.

6. A method of manufacturing a brake shoe (1) defined by a carrier plate (2) having arranged thereon a single intermediate layer (4) and a friction lining (6) upon the single intermediate layer (4), the single intermediate layer (4) being made of binding material which is soft as compared to material of the friction lining (6) and being highly dampening and noise-reducing, the single intermediate layer (4) including on a side surface facing the friction lining (6) a plurality of three-dimensional surface contours (5) projecting in a direction away from the carrier plate (2), the friction lining (6) on a side facing the carrier plate (2) having surface contours complementary to the surface contours (5) of the single intermediate layer (4), and the intermediate layer surface contours (5) being bonded to the friction lining complementary surface contours absent a boundary member therebetween by performing the steps of:
  (a) pre-press molding the friction lining material to create a pre-pressed friction lining (6) including the complementary surface contours thereof,
  (b) inserting the pre-pressed friction lining (6) into a press mold,
  (c) introducing the intermediate layer material atop the complementary surface contours of the pre-pressed friction lining (6) after the creation of the pre-pressed friction lining (6) in accordance with step (a), and
  (d) finish press molding the pre-pressed friction lining (6) and the intermediate layer material and bonding the two together absent a boundary member therebetween while bonding the single finish press molded intermediate layer (4) upon the entirety of a surface of the carrier plate (2) absent mechanical attachment therebetween.

* * * * *

UNITED STATES PATENT AND TRADEMARK OFFICE
CERTIFICATE OF CORRECTION

| | |
|---|---|
| PATENT NO. | : 7,234,573 B2 |
| APPLICATION NO. | : 10/332529 |
| DATED | : June 26, 2007 |
| INVENTOR(S) | : Gerhard Kurz et al. |

It is certified that error appears in the above-identified patent and that said Letters Patent is hereby corrected as shown below:

On the title page, item (22), PCT filing information should read as follows:

--PCT Filed:   June 21, 2001--

Signed and Sealed this

Twenty-ninth Day of April, 2008

JON W. DUDAS
*Director of the United States Patent and Trademark Office*